United States Patent
Homescu et al.

(10) Patent No.: US 10,303,861 B2
(45) Date of Patent: May 28, 2019

(54) SOFTWARE DIVERSIFICATION IN EXTERNAL CONTEXTS

(71) Applicant: IMMUNANT, INC., Irvine, CA (US)

(72) Inventors: Andrei Homescu, Irvine, CA (US); Stephen J. Crane, Irvine, CA (US); Per Larsen, Irvine, CA (US)

(73) Assignee: IMMUNANT, INC., Irvine, CA (US)

( * ) Notice: Subject to any disclaimer, the term of this patent is extended or adjusted under 35 U.S.C. 154(b) by 0 days.

(21) Appl. No.: 15/871,663

(22) Filed: Jan. 15, 2018

(65) Prior Publication Data

US 2018/0211017 A1 Jul. 26, 2018

Related U.S. Application Data

(60) Provisional application No. 62/450,720, filed on Jan. 26, 2017.

(51) Int. Cl.
| | |
|---|---|
| *G06F 9/44* | (2018.01) |
| *G06F 21/14* | (2013.01) |
| *G06F 9/455* | (2018.01) |
| *G06F 8/70* | (2018.01) |
| *G06F 8/41* | (2018.01) |

(52) U.S. Cl.
CPC .............. *G06F 21/14* (2013.01); *G06F 8/41* (2013.01); *G06F 8/70* (2013.01); *G06F 9/45558* (2013.01)

(58) Field of Classification Search
CPC ................................ G06F 21/14; G06F 21/125
USPC ........................... 717/100–109, 116, 120–122
See application file for complete search history.

(56) References Cited

U.S. PATENT DOCUMENTS

| | | | | |
|---|---|---|---|---|
| 5,881,219 A | * | 3/1999 | Leung ................. | G06F 11/3664 714/31 |
| 6,334,189 B1 | * | 12/2001 | Granger ............... | G06F 21/123 380/255 |
| 6,385,765 B1 | * | 5/2002 | Cleaveland .............. | G06F 8/10 717/100 |
| 6,463,538 B1 | * | 10/2002 | Elteto ................... | G06F 21/125 713/190 |
| 6,779,114 B1 | * | 8/2004 | Chow .................... | G06F 21/14 713/189 |
| 8,307,437 B2 | * | 11/2012 | Sebes ...................... | G06F 21/51 29/25.01 |
| 8,584,109 B2 | * | 11/2013 | Anckaert ............... | G06F 21/53 717/148 |
| 8,782,603 B2 | * | 7/2014 | Plate ................... | G06F 9/44505 717/121 |

(Continued)

OTHER PUBLICATIONS

Saez et al, "Operating System Support for Mitigating Software Scalability Bottlenecks on Asymmetric Multicore Processors", ACM, pp. 31-4-, 2010 (Year: 2010).*

(Continued)

*Primary Examiner* — Anil Khatri (57) ABSTRACT

The present invention features a system in which dynamic code randomization may be used in concert with enforcement-based mitigation policies to optimally secure a software code. A privileged, external execution context is employed when rewriting (randomizing) the software code. The rewritten code is then reloaded and executed in a less privileged execution context. Finally, the system ensures that the less privileged execution context is authorized to load and execute the code before rewriting.

46 Claims, 5 Drawing Sheets

(56) References Cited

U.S. PATENT DOCUMENTS

| | | | | |
|---|---|---|---|---|
| 9,021,587 | B2* | 4/2015 | Goel | G06F 21/577 |
| | | | | 714/1 |
| 9,043,747 | B2* | 5/2015 | Eksten | G06F 8/70 |
| | | | | 717/105 |
| 9,218,467 | B2* | 12/2015 | Matthews | G06F 21/52 |
| 9,390,260 | B2* | 7/2016 | Tan | G06F 8/427 |
| 10,079,841 | B2* | 9/2018 | Gupta | G06F 21/54 |
| 2016/0025028 | A1* | 1/2016 | Vaughan | F02D 41/263 |
| | | | | 701/105 |
| 2018/0276372 | A1* | 9/2018 | Crabtree | G06Q 40/08 |

OTHER PUBLICATIONS

Casado-Lumbreras et al, "Mitigating issues in Global Software Developments by means of Mentoring", ACM, pp. 69-74, 2015 (Year: 2015).*
Portokalidis et al, "Fast and Practical Instruction-Set Randomization for Commodity Systems", ACM, 41-48 (Year: 2010).*
Wartell et al, "Binary Stirring: Self-randomizing Instruction Addresses of Legacy x86 Binary Code", ACM, pp. 157-168 (Year: 2012).*
Zheng et al, "Random Unit-Test Generation with MUT-aware Sequence Recommendation", ACM, pp. 293-296 (Year: 2010).*
Barrantes et al, "Randomized Instruction Set Emulation", ACM Transactions on Information and System Security, vol. 8, No. 1, pp. 3-40. (Year: 2005).*
Gupta et al, "Marlin: Mitigating Code Reuse Attacks Using Code Randomization", IEEE Transactions on Dependable and Secure Computing, vol. 12, No. 3, pp. 326-337 (Year: 2015).*
M. Backes, T. Holz, B. Kollenda, P. Koppe, S. Nürnberger, and J. Pewny. You can run but you can't read: Preventing disclosure exploits in executable code. In ACM Conference on Computer and Communications Security (CCS), 2014.
A. Bittau, A. Belay, A. J. Mashtizadeh, D. Mazieres, and D. Boneh. Hacking blind. In IEEE Symposium on Security and Privacy (S&P), 2014.
K. Braden, S. Crane, L. Davi, M. Franz, P. Larsen, C. Liebchen, and A.-R. Sadeghi. Leakage-resilient layout randomization for mobile devices. In Network and Distributed System Security Symposium (NDSS), 2016.
F. Cohen. Operating system protection through program evolution. Computers and Security, 12, 1993.
M. Conti, S. Crane, T. Frassetto, A. Homescu, G. Koppen, P. Larsen, C. Liebchen, M. Perry, and A. Sadeghi. Selfrando: Securing the tor browser against de-anonymization exploits. In Privacy Enhancing Technologies Symposium (PETS), 2016.
J. Corbet. User-space page fault handling. https://lwn.net/Articles/550555.
S. Crane, A. Homescu, and P. Larsen. Code randomization: Haven't we solved this problem yet? In IEEE Cybersecurity Development (SecDev), 2016.
S. Crane, C. Liebchen, A. Homescu, L. Davi, P. Larsen, A.-R. Sadeghi, S. Brunthaler, and M. Franz. Readactor: Practical code randomization resilient to memory disclosure. In IEEE Symposium on Security and Privacy (S&P), 2015.
L. V. Davi, A. Dmitrienko, S. Nürnberger, and A. Sadeghi. Gadge me if you can: secure and efficient ad-hoc instruction-level randomization for x86 and ARM. In ACM Symposium on Information, Computer and Communications Security (ASIACCS), 2013.
S. Forrest, S. A. Hofmeyr, and A. Somayaji. Computer immunology. Communications of the ACM, 40(10):88-96, Oct. 1997.
J. Gionta, W. Enck, and P. Ning. HideM: Protecting the contents of userspace memory in the face of disclosure vulnerabilities. In ACM Conference on Data and Application Security and Privacy (CODASPY), 2015.
W. E. Gionta, Jason and P. Larsen. Preventing kernel code-reuse attacks through disclosure resistant code diversification. In IEEE Conference on Communications and Network Security (CNS), 2016.
A. Homescu, T. Jackson, S. Crane, S. Brunthaler, P. Larsen, and M. Franz. Large-scale automated software diversity—program evolution redux. IEEE Transactions on Dependable and Secure Computing, 2015.
R. Hund, C. Willems, and T. Holz. Practical timing side channel attacks against kernel space aslr. In Proceedings of the 2013 IEEE Symposium on Security and Privacy, pp. 191-205, Washington, DC, USA, 2013. IEEE Computer Society.
Y. Jang, S. Lee, and T. Kim. Breaking kernel address space layout randomization with intel tsx. In ACM Conference on Computer and Communications Security (CCS), pp. 380-392, New York, NY, USA, 2016. ACM.
C. Kil, J. Jun, C. Bookholt, J. Xu, and P. Ning. Address space layout permutation (ASLP): Towards fine-grained randomization of commodity software. In Annual Computer Security Applications Conference (ACSAC), 2006.
P. Larsen, A. Homescu, S. Brunthaler, and M. Franz. SoK: Automated software diversity. In IEEE Symposium on Security and Privacy (S&P), 2014.
M. Miller. Mitigating arbitrary native code execution in microsoft edge, 2017. https://blogs.windows.com/msedgedev/2017/02/23/mitigating-arbitrary-native-code-execution/.
PaX Team. Homepage of the PaX Team, 2001. http://pax.grsecurity.net.
G. F. Roglia, L. Martignoni, R. Paleari, and D. Bruschi. Surgically returning to randomized lib(c). pp. 60-69, 2009.
J. H. Saltzer. Protection and the control of information sharing in multics. Communications of the ACM, 17(7):388-402, 1974.
F. J. Serna. The info leak era on software exploitation. In BlackHat USA, 2012.
H. Shacham. The geometry of innocent flesh on the bone: Return-into-libc without function calls (on the x86). In ACM Conference on Computer and Communications Security (CCS), 2007.
H. Shacham, M. Page, B. Pfaff, E. Goh, N. Modadugu, and D. Boneh. On the effectiveness of address-space randomization. In ACM Conference on Computer and Communications Security (CCS), 2004.
J. Siebert, H. Okhravi, and E. Söderström. Information leaks without memory disclosures: Remote side channel attacks on diversified code. In ACM Conference on Computer and Communications Security (CCS), 2014.
K. Z. Snow, F. Monrose, L. Davi, A. Dmitrienko, C. Liebchen, and A. Sadeghi. Just-in-time code reuse: On the effectiveness of fine-grained address space layout randomization. In IEEE Symposium on Security and Privacy (S&P), 2013.
R. Wartell, V. Mohan, K. W. Hamlen, and Z. Lin. Binary stirring: self-randomizing instruction addresses of egacy x86 binary code. In ACM Conference on Computer and Communications Security (CCS), 2012.
D. Weston and M. Miller. Windows 10 mitigation improvements. In BlackHat USA, 2016.

* cited by examiner

```
00400000-0040c000  r-xp  00000000  08:03  5514964   /usr/bin/cat
0060b000-0060c000  r--p  0000b000  08:03  5514964   /usr/bin/cat
0060c000-0060d000  rw-p  0000c000  08:03  5514964   /usr/bin/cat
01c05000-01c26000  rw-p  00000000  00:00  0         [heap]
7f335dbd0000-7f335dd65000  r-xp  00000000  08:03  5508248   /usr/lib/libc-2.24.so
7f335dd65000-7f335df64000  ---p  00195000  08:03  5508248   /usr/lib/libc-2.24.so
7f335df64000-7f335df68000  r--p  00194000  08:03  5508248   /usr/lib/libc-2.24.so
7f335df68000-7f335df6a000  rw-p  00198000  08:03  5508248   /usr/lib/libc-2.24.so
7f335df6a000-7f335df6e000  rw-p  00000000  00:00  0
7f335df6e000-7f335df91000  r-xp  00000000  08:03  5508247   /usr/lib/ld-2.24.so
7f335e15e000-7f335e160000  rw-p  00000000  00:00  0
7f335e16e000-7f335e190000  rw-p  00000000  00:00  0
7f335e190000-7f335e191000  r--p  00022000  08:03  5508247   /usr/lib/ld-2.24.so
7f335e191000-7f335e192000  rw-p  00023000  08:03  5508247   /usr/lib/ld-2.24.so
```

FIG. 5

SOFTWARE DIVERSIFICATION IN EXTERNAL CONTEXTS

CROSS REFERENCE

This application claims priority to U.S. patent application Ser. No. 62/450,720, filed Jan. 26, 2017, the specification of which is incorporated herein in its entirety by reference.

GOVERNMENT SUPPORT

This invention was made with government support under Grant No. FA8750-10-C-0237 awarded by the Defense Advanced Research Projects Agency. The government has certain rights in the invention.

The views, opinions and/or findings expressed are those of the authors and should not be interpreted as representing the official views or policies of the Department of Defense or the U.S. Government.

FIELD OF THE INVENTION

The present invention relates to transforming software code in the presence of policies enforced in the cede execution context, more specifically, to employing randomization-based exploit mitigations when enforcement-based mitigations prohibiting code rewriting are present.

BACKGROUND OF THE INVENTION

To err is human. Programming errors in software can have dire security consequences, in some cases, maliciously crafted inputs can take control of the running program and cause it to perform arbitrary computation and escalate privileges. Therefore, software defects threaten the confidentiality, integrity, and availability of computer systems. Current best practice is to use a multitude of information security techniques to defend computer systems. The last line of defense, exploit mitigations, are typically woven directly into the protected code and integrated into the host operating system and software development tools. The present invention focuses on interactions between these mitigations.

Mitigations are based on enforcement, randomization, or a mix of both. Enforcement-based mitigations impose constraints (or policies) on program executions such that certain, potentially malicious actions terminate the program before any harm is done. Randomization-based mitigations change the program representation to make the effects of malicious inputs unpredictable. Thus, randomization provides probabilistic guarantees that malicious inputs will cause program termination. It is generally preferable to protect programs by a combination of enforcement and randomization-based exploit mitigations because the different techniques have complementary strengths and weaknesses. However, enforcement-based mitigations can interfere with code randomization. A concrete example of a policy P that can be enforced to stop an exploit is:

memory storing executable instructions shall not be modified,
memory shall not simultaneously be writable and executable, and
memory that was writable shall not be made executable.

Some randomization-based mitigations randomize (i.e., rewrite) the program representation in the same execution context as the program being protected. Attempting to perform randomization in an execution context subject to policy P would cause the program to terminate. The invention described herein allows dynamic code randomization to be used in concert with policies such as P. By dynamic, it is meant any kind of randomization that happens during initialization or execution of a program. Formally, if the set of security policies for an execution context $c_{low}$ prevents the original code to be randomized within that context, we request that randomization be done in a more privileged execution context $c_{high}$. Thereafter, the less privileged context $c_{low}$ loads and executes the randomized code without violating any security policies.

Overview of Randomization-Based Mitigations

A. Software Diversity

Software diversity is a tested and proven mitigation strategy against a wide variety of attacks that rely on program layouts and other implementation details such as code reuse attacks. Software diversity takes its inspiration from nature, where a population of plants resists threats by having different built-in responses to threats. For example, the animals in a herd will respond differently to a viral outbreak, with some of them surviving the virus due to their different genetics. In the same way, diversified software can be designed and built such that no attack can uniformly exploit it, as all copies of a program are different from each other. This is a counter to the so-called "software monoculture", where all running copies of the same program, e.g., MICROSOFT (Computer Programs) Word or INTERNET EXPLORER (browsers, namely, software for browsing the global computer network and secure private networks, and software programs to connect computers to the global computer network and to secure private networks), are identical and can be exploited the same way. For example, attackers currently target specific versions of popular software and build one pre-packaged version of an exploit, which then works on thousands or millions of target systems.

B. Address Space Layout Randomization (ASLR)

ASLR is one very common and widely used embodiment of software diversity, and has been implemented and deployed by all major operating systems (e.g., WINDOWS (computer programs and manuals sold as a unit), LINUX (a computer operating system software to facilitate computer use and operation), MACOS (computer operating software), and mobile variants such as ANDROID (operating system software) and IOS (computer operating software). ASLR operates as a coarse-grained diversification by randomizing the base memory address for each module (binary program or library) loaded in memory. However, recent academic and practical experience has shown that ASLR can, in many cases, be easily bypassed due to its coarse granularity and low entropy.

Fine-Grained Diversity

One solution to the shortcomings of ASLR are fine-grained randomization techniques, such as "garbage" code insertion, code substitution, or function shuffling. The main idea behind fine-grained diversity is to spread the diversification across the program and make many smaller choices in many places, instead of fewer, central choices like in ASLR.

There are many viable approaches and implementations of fine-grained diversity. Like compilation, randomization can be done ahead of time, during installation, loading or even during execution. Load-time, fine-grained randomization strikes a good balance between performance, security, and practicality. This approach strengthens a program by diversifying it (using one or more of the techniques mentioned earlier) right before the program starts running. Before the first proper program instruction is executed, the randomization engine—a component of either the operating system (OS), the program loader, or the program binary itself—randomizes the code of the client and then transfers execution to it. In some aspects, load-time randomization can be regarded as an improved, fine-grained ASLR. A randomization engine may run inside the operating system (OS) process of the randomized client. Because enforcement mitigations apply policies at the granularity of processes, such "in-process" transformations are subject to the same policies as the program being protected.

Overview of Enforcement-Based Mitigations

Processors (including CPUs, microprocessors, and microcontrollers, digital-signal processors, etc.) fetch and execute machine code from primary storage such as random access memory (RAM). Processors having a memory management unit (MMU) translate from virtual memory addresses to physical memory addresses. Virtual memory translation is done at the level of memory pages such that any two virtual addresses inside the same page reference the same physical memory page. Each memory page is associated with a set of permissions, which are enforced by the MMU on each memory access. Memory permissions, or protection bits, control whether a page is accessible, readable, writable, executable, or some combination thereof. A process can request to change memory access permissions, typically via dedicated system calls; this modification is required to support dynamic linking and compilation. If a process makes an access that violates the memory permissions, the operating system sends it a signal, which if left unhandled, terminates the process. Processors that have a memory projection unit (MPU), rather than an MMU, typically enforce memory access permissions on larger memory regions.

Memory permissions play an important role in preventing exploits. Stack memory used to possess both write and execute capabilities. This allowed adversaries to inject code directly. W⊕X policies ensuring that no memory page is simultaneously writable and executable (unless explicitly requested by the program and permitted by enforcement mitigations) prevent simple code injection exploits. Code pages are mapped with read and execute permissions by default while pages containing data have read permissions, and optionally write permissions. Enforcement-type mitigations add additional policies to restrict what memory permissions programs can request. For example:

Code pages mapped in from files cannot be made writable (either during the initial mapping or later). This restriction is called "execmod" in SELinux parlance.

Data pages (either from files or allocated by the program) cannot be made executable. SELinux calls this restriction "execmem".

Pages cannot be writable and executable at the same time, i.e., have RWX permissions.

Unprivileged programs cannot write executable code.

Such policies have been deployed as "Arbitrary Code Guard" on WINDOWS 10 (although not enabled by default, but opt-in for every application), "PaX MPROTECT" on LINUX and SELinux on both ANDROID and desktop LINUX.

A fine-grained code randomization engine that diversifies code during program loading or at any later time needs to violate at least one of these restrictions to perform code randomization. However, disabling these restrictions exposes the client process to attacks.

A. Execute-Only Memory

Fine-grained diversification has successfully raised the cost of exploitation for attackers, but has not completely mitigated attacks. Even after randomization, a diversified program is still available in memory for both reading and execution. In many cases, attackers can work around the randomization and undo its effects by locating and reading the randomized code (using a separate memory disclosure vulnerability or side channel), which provides attackers with full knowledge of the contents and addresses of the code. While a memory disclosure is now required as an additional step in the attack, and may not always be available, researchers have shown significant practical examples of such leaks.

Execute-only memory (XoM) is a recent mitigation against memory disclosure attacks on program code. XoM protects randomized program code by allowing the program to mark pages as executable but not readable, preventing all read accesses to those pages. Academic researchers have demonstrated several approaches that provide XoM using a variety of software-only or hybrid approaches. ARM and Intel have also recently added native and efficient support for this feature to their processors.

B. Execution Contexts

In computer systems, one way to restrict the damage that a program can do is to restrict its capabilities only to those that the program requires to function correctly. This approach is also known as the "principle of least privilege", and was introduced by Jerome Saltzer:

"Every program and every privileged user of the system should operate using the least amount of privilege necessary to complete the job."

Figure 1:
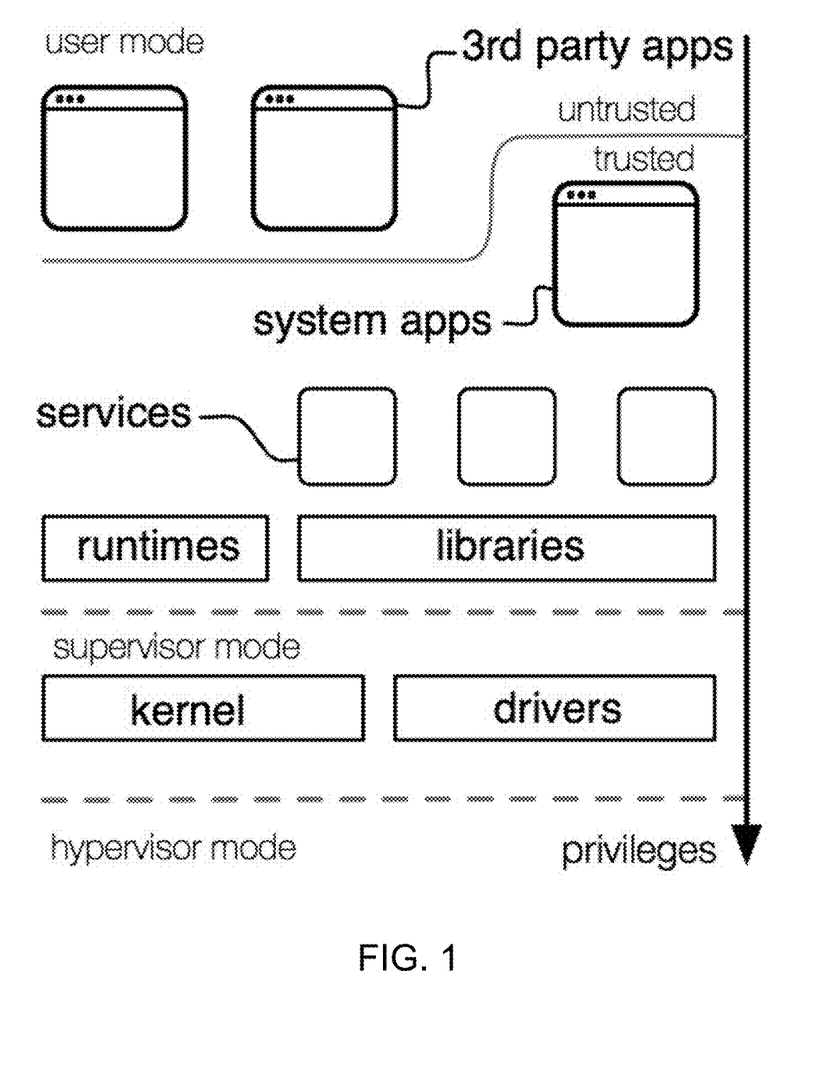
FIG. 1 shows a diagrammatic representation of privilege hierarchy in execution contexts.

Modern hardware and operating systems separate programs into "processes", and give each process different permissions, capabilities, and address spaces. Additionally, the operating system kernel (and its associated programs) runs at a much higher privilege level than regular programs. The development of hypervisors—software that executes at an even higher level than the operating system, and manages the execution of several operating systems at once—has added an additional level in the hierarchy of permissions. Each of these components—hypervisors, operating system kernels, system and regular programs—form "execution contexts" which hold information and have privileges that are inaccessible to others at the same or lower level as shown in FIG. 1.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for providing randomization-based mitigation of a software code executed in a primary execution context that is protected by enforcement-based mitigations. The randomization is performed in a secondary execution context, thus removing an incompatibility between the randomization—based mitigation and said enforcement-based mitigations, thus enhancing the security of the software code.

In some embodiments, the system comprises a client configured to execute a client binary file, where the client is the primary execution context and the client binary file is the software code. In an embodiment, the client has an address space into which the client binary file may be mapped. In other embodiments, a randomization engine (alternately, a randomizer), acts as the secondary execution context within which randomization-based mitigation of the client binary file is performed. In a preferred embodiment, the primary output of the randomizer is randomized code. In further embodiments, a communicate channel operatively connects the client to the randomizer. Additionally, a randomization cache (109) may be operatively coupled to the randomizer for storing the randomized code.

Consistent with previous embodiments, when a client process begins execution of the client binary file, an entry point inside the client process opens the communication channel to the randomizer. The client then sends a randomization request and a first identifier of the client binary file to the randomizer via the communication channel, in some embodiments, the first identifier may be a client binary file path. In further embodiments, the randomizer identities the client binary file, via the first identifier, and reads the client binary file. Alter reading, the randomizer may diversity the contents of the client binary file to produce the randomized code. The randomized code may then be sent to a location in the randomization cache, via the communication channel, for storage. In an alternative embodiment, the randomization cache is bypassed and the randomized code is sent directly to the client.

In additional embodiments, the randomizer sends the location of the randomized code to the client via the communication channel. In other embodiments, a second identifier sent along with the location of the randomized code. In an alternate embodiment, the second identifier is sent in lieu of the location of the randomized code. Mapping of the randomized code to the memory space of the client is then performed after first un-mapping the client binary file from said memory space (if necessary). The client may then execute the randomized code.

Code written in systems programming languages is often protected by a combination of security techniques known as exploit mitigations. Some of these techniques enforce constraints and policies that prevent malicious or unsafe computations. Other techniques randomize aspects of the program implementation such that it becomes unpredictable and thus harder to exploit by adversaries. Mitigations that rewrite code at load time or thereafter introduce computations that are not allowed under certain enforcement-based defenses. Strawman solutions such as disabling load-time randomization or loosening the constraints to allow code randomization are sub-optimal with respect to security.

The system of the present invention removes the aforementioned incompatibility so that enforcement and randomization-based mitigations can be used together without loss of security. The key idea is to use an external execution context for rewriting. Specifically, the present invention eliminates incompatibilities that arise when rewriting (e.g., randomizing) code in the execution context C of the protected program and the execution context C does not permit execution of modified memory pages. In this technique, code is first rewritten in a privileged execution context C'. The rewritten code is subsequently (re)loaded and executed in a less privileged execution context. Finally, the present system ensures that the less privileged execution context is authorized to load and execute the code before rewriting it externally.

Further, current load-time randomization solutions perform randomization in the same execution context (i.e., operating system process) as the software code. This approach may require giving the software code additional permissions, when are not required after randomization, thereby increasing the privileges available to an attacker.

The present invention overcomes the prior art limitation (i.e., reconciling the incompatibility without compromising performance or security) by applying the randomization-based mitigation in a secondary execution context, while the enforcement-based mitigations are applied to the primary execution context running the software code. Thus, the randomization-based mitigation is able to be applied in concert with enforcement-based mitigations.

It is not obvious to an ordinary computer scientist that OS-provided inter-process communication mechanisms allow file descriptors or handles to be exchanged between processes. This embodiment is surprisingly elegant: the randomized file may be unlinked such that the host OS will automatically reclaim the storage space once the client process exits (this simplifies the present implementation and makes it more robust). The OS determines whether to write the randomized code to disk or whether to keep it in the disk cache (i.e., in RAM). The randomizer process can also inspect the client process to verify that it is indeed allowed to execute the code. This protects against malicious clients.

The components composing the present system are intended to refer to a computer-related entity or an entity related to an operational machine with one or more specific functionalities. These entities may either be hardware, a combination of hardware and software, software, or software in execution. Examples of said disclosed components include, but are not limited to: a process running on a processor, a processor, an object, an executable, a thread of execution, a program, and/or a computer. To illustrate, both an application running on a server and the server can be a component. One or more components may reside within a process and/or thread of execute and a component may be localized on one computer and/or distributed between two or more computers. Also, these components can execute from various computer readable media having various data structures stored thereon. The components may communicate via local and/or remote processes such as in accordance with a message having one or more data packets (e.g., data from one component interacting with another component in a local system, distributed system, and/or across a network such as the internet with other systems via the signal).

Technology-Specific Problem/Solution

The system of the present invention addresses a problem singularly rooted in technology, that is, the incompatibility of enforcement-based exploit mitigations and randomization-based mitigations. This problem is not obvious to an ordinary computer scientist, because the prior art teaches that processes be allowed to modify or transform their own code from inside their execution context, as that is one of the main benefits of the von Neumann architecture. Some computer security techniques (exploit mitigations) place restrictions that forbid some computations allowed by a pure von Neumann architecture. Data execution prevention (known as DEP, NX, XN) was the first such technique. State-of-the-art code protection techniques such as SELinux, PaX MPROTECT and Arbitrary Code Guard restrict computations beyond DEP. Because the prior art teaches that processes be allowed to modify their own code from inside their execution context, it is not obvious that a problem would arise when attempting to combine enforcement based mitigations and code randomization.

In order to resolve this conflict, the present invention utilizes a client server architecture in a novel way to permit programs to securely access privileges that they normally would not be able to access. As shown in FIG. 1, the server runs in a more privileged execution context than the client, for example, the randomization engine may operate as a service in the trusted content, while the client is a third-party application. Rather than granting the privileges to the client, which would negate the enforcement based mitigations and be a security risk, the server (for instance the randomization engine) performs privileged operations on behalf of the client, while ensuring that those privileges are only used for specific purposes such as code randomization. This prevents the use of the higher level privileges from being a security risk. This invention would not be obvious to those skilled in the art because the prior art teaches against allowing a less privileged process to use higher level privileges. The invention utilizes a unique mechanism for allowing those privileges to be accessed for only specific, limited purposes.

In addition, the present invention utilizes interprocess communication mechanisms in a unique manner by exchanging file descriptors between processes. These file descriptors are created when the program opens a file for reading or writing and usually exist only within program memory. This allows the server process to read the binary file code from program memory and the client process to read memory stored in the randomization cache, without that memory being written to disk. Nothing in the prior art teaches utilizing OS-provided inter-process communication mechanisms in this manner. The prior art teaches away from allowing multiple processes to open the same file for reading/writing at the same time. In addition, it is common practice for file descriptors to be stored in local memory and erased when the program exits. Passing a file descriptor from one process to another to allow another process to access the local memory of the first process is therefore counter-intuitive and non-obvious.

Mitigations that rewrite (e.g., randomize) code at load time or thereafter introduce computations that are not allowed under certain enforcement-based mitigations. However, to ensure optimal security of software code, employing both mitigation techniques in concert is preferable since they exhibit complementary strengths and weaknesses. The proposed system provides a technical solution (i.e., the removal of the aforementioned incompatibility) by rewriting (i.e., randomizing) the software code in a secondary execution context and subsequently reloading the code for execution in a primary execution context. In this way, the enforcement-based mitigation policies to which the primary execution context is subject are bypassed.

Computer Requirements

Software features not accessible on a standard computer are required to employ the proposed system. A component called the randomization engine must be provided to operate as the secondary execution context. The randomization engine requests (and receives) privileges distinct from the privileges assigned to the primary execution context by the operating system. Additionally, the randomization engine must be designed to correspond with the primary execution context (and a storage element storing the randomized code) for transmitting and receiving the original software code and the randomized software code.

BRIEF DESCRIPTION OF THE DRAWINGS

The features and advantages of the present invention will become apparent from a consideration of the following detailed description presented in connection with the accompanying drawings in which.

DEFINITIONS

As used herein, the term "client" refers to the target program that is randomized or otherwise rewritten.

As used herein, the term "communication channel" refers to a means of communication between the client and the randomizer.

As used herein, the term "execution context" refers to the set of all privileges available to a piece of machine code during execution.

As used herein, the term "randomization cache" refers to a temporary storage area that holds the randomization output.

As used herein, the term "randomizer" refers to the module that performs a transformation (for example, a randomization) of a given code, inside a separate execution context from the client.

As used herein, the term "randomization engine" is used interchangeably with the term randomizer.

DETAILED DESCRIPTION OF THE INVENTION

Referring now to FIGS. 1-5, the present invention features a system for providing randomization-based mitigation of a software code executed via a primary execution context protected by enforcement-based mitigations, wherein an execution context comprises the set of all privileges available to a piece of machine code during execution, wherein said randomization-based mitigation is used in a secondary execution context, wherein the secondary execution context has privileges which bypass the enforcement-based mitigations, thus allowing the randomization-based mitigation to be performed in concert with said enforcement-based mitigations. In a primary embodiment the system comprises a primary execution context, wherein the primary execution context is subject to enforcement based mitigations; a secondary execution context, wherein the secondary execution context is not subject to the restrictions placed on the primary execution context by enforcement-based mitigations: a client binary file (103); a client (101), configured to execute the client binary file (103), having a memory space, wherein the client binary file (103) is optionally mapped to the memory space, wherein the client (101) executes the software code in the primary execution context, wherein the client binary file (103) is the software code; a randomization engine, herein referred to as a randomizer (107), executed in the secondary execution context within which randomization-based mitigation of the client binary file (103) is performed, wherein an output of the randomizer (107) is a randomized code; a communication channel (105) operatively connecting the client (101) and the randomizer (107); and a randomization cache (109), operatively coupled to the randomizer (107), storing the randomized code.

In a primary embodiment, when a client process begins execution of the client binary file (103) within the primary execution context, an entry point inside the process opens the communication channel (105) to the randomizer (107), which operates in the secondary execution context. The client (101) then sends a randomization request and a first identifier to the randomizer (107) via the communication channel (105), wherein the identifier comprises the location of the client binary file (103).

In a primary embodiment, the randomizer (107) then identifies the location of the client binary file (103) from the first identifier, whereupon the randomizer (107) reads the client binary file (103) and subsequently diversifies contents of the client binary file (103) in the secondary execution context, to produce the randomized code, which is then sent to and stored at a location in the randomization cache (109).

In a primary embodiment, the randomizer (107) sends a second identifier to the client (101) via the communication channel (105), wherein the second identifier comprises the location of the randomized code. The client (101) then maps the randomized code to the memory space in the primary execution context after un-mapping the client binary file (103) from the memory space, if necessary. The client (101) then executes the randomized code in the primary execution context. In varying embodiments, the location of the client binary file (103) and the randomized code, may be communicated via a file path, a file descriptor, filesystem inode, address pointer, or any other identifier which allows the client (101) and/or randomization engine (107) to locate the code in question.

In supplementary embodiments, the randomizer (107) is configured to authenticate the client (101) in order to ensure authorized execution of the client binary file (103). If the client (101) is not authorized, then the randomizer (107) may reject the randomization request. If the randomization request is rejected, the client (101) may then be subject to one or more actions such as: termination, logging, or reporting of the attempt to randomize the client binary file (103) in an alternate embodiment, the randomizer (107) may authenticate the client (101) via an authentication process provided by an operating system of a machine upon which the client (101) resides.

In exemplary embodiments, the randomizer (107) and the client (101) reside on the same physical (or virtual) machine. In alternate embodiments, the randomizer (107) resides on a different physical (or virtual) machine than the client (101).

In supplementary embodiments, after producing the randomized code, a plurality of references to the randomized code within the memory space of the client (101) are updated. The randomizer (107) may apply updates to one or more of the plurality of references. However, in some embodiments, a portion of these references lie inside non-code data regions within the memory space and so, must be updated separately. There are a variety of ways for performing these separate updates. Non-exhaustive examples include, but are not limited to:

having the randomizer (107) generate an encoded list of updates and transmitting the list to the client (101) via the communication channel (105), where the updates are then performed by the client (101);

having the randomizer append an encoded list of the updates to the randomized code for transmission to the client (101) via the communication channel (105), where the client (101) then performs the updates;

having the randomizer (107) apply the updates via a cross-context memory modification tool, such as shared memory;

having the randomizer (107) generate a set of data pages comprising pre-applied updates for the plurality of references, where the client (101) maps the set of data pages to the memory space; or having the client (101) replicate a portion of code executed by the randomizer (107) to build a list of the updates, where the client (101) then performs the updates based on the list.

In an alternative embodiment, the present invention also comprises a system for providing transformation of a software code executed via a primary execution context protected by enforcement-based mitigations, wherein an execution context comprises the set of all privileges available to a piece of machine code during execution, wherein said transformation is used in a secondary execution context, wherein the secondary execution context has higher privileges than the primary execution context, thus allowing the transformation to be performed in concert with said enforcement-based mitigations. The system comprises a primary execution context, wherein the primary execution context is subject to enforcement based mitigations; a secondary execution context, wherein the secondary execution context is not subject to the restrictions placed on the primary execution context by a enforcement-based mitigations; a client binary file (103); a client (101), configured to execute the client binary file (103), having a memory space, wherein the client binary file (103) is optionally mapped to the memory space, wherein the client (101) executes the software code in the primary execution context, wherein the client binary file (103) is the software code which is protected by enforcement based mitigations; a transformation engine (107), executed in the secondary execution context within which transformation of the client binary file (103) is performed, wherein an output of the transformation engine (107) is a transformed code; a communication channel (105) operatively connecting the client (101) and the transformation engine (107); and a transformation cache (109), operatively coupled to the transformation engine (107), storing the transformed code.

In an alternative embodiment, when a client process begins execution of the client binary file (103) within the primary execution context, an entry point inside the process opens the communication channel (105) to the transformation engine (107), operating in the secondary execution context, wherein the client (101) then sends a transformation request and a first identifier to the transformation engine (107) via the communication channel (105), wherein the identifier comprises the location of the client binary file (103).

In an alternative embodiment, the transformation engine (107) then identifies the location of the client binary file (103) from the first identifier, wherein the transformation engine (107) reads the client binary file (103) and subsequently transforms the contents of the client binary file (103) in the secondary execution context, to produce the transformed code, which is then sent to and stored at a location in the transformation cache (109).

In an alternative embodiment, the transformation engine (107) sends a second identifier to the client (101) via the communication channel (105), wherein the second identifier comprises the location of the transformed code, wherein the client (101) then maps the transformed code to the memory space in the primary execution context alter un-mapping the client binary file (103) from the memory space if necessary, wherein the client (101) then executes the transformed code in the primary execution context.

Similar to the randomization-based mitigation system detailed previously, further embodiments of the software code transformation system may feature a transformation engine (107) configured to authenticate the client (101) in order to ensure authorized execution of the client binary file (103). Again, if the client (101) is not authorized, the transformation engine (107) may reject the transformation request. If the transformation request is rejected, the client (101) may then be subject to one or more actions such as: termination, logging or reporting of the attempt to transform the client binary file (103). In an alternate embodiment, the transformation engine (107) may authenticate the client (101) via an authentication process provided by an operating system of a machine upon which the client (101) resides.

In some embodiments, the transformation engine (107) and the client (101) reside on the same physical (or virtual) machine. Other embodiments feature the transformation engine (107) residing on a different physical (or virtual) machine than the client (101).

In supplementary embodiments, after producing the transformed code, a plurality of references to the transformed code within the memory space of the client (101) are updated. The transformation engine (107) may apply updates to one or more of the plurality of references. However, in some embodiments, a portion of these references lie inside non-code data regions within the memory space and so, must be updated separately. There are a variety of ways for performing these separate updates. Non-exhaustive examples include, but are not limited to:
- having the transformation engine (107) generate an encoded list of updates and transmitting the list to the client (101) via the communication channel (105), where the updates are then performed by the client (101);
- having the transformation engine (107) append an encoded list of the updates to the transformed code for transmission to the client (101) via the communication channel (105), where the client (101) then performs the updates;
- having the transformation engine (107) apply the updates via a cross-context memory modification tool, such as shared memory;
- having the transformation engine (107) generate a set of data pages comprising pre-applied updates for the plurality of references, where the client (101) maps the set of data pages to the memory space; or
- having the client (101) replicate a portion of code executed by the transformation engine (107) to build a list of the updates, where the client (101) then performs the updates based on the list.

Details of the Invention

Figure 2:
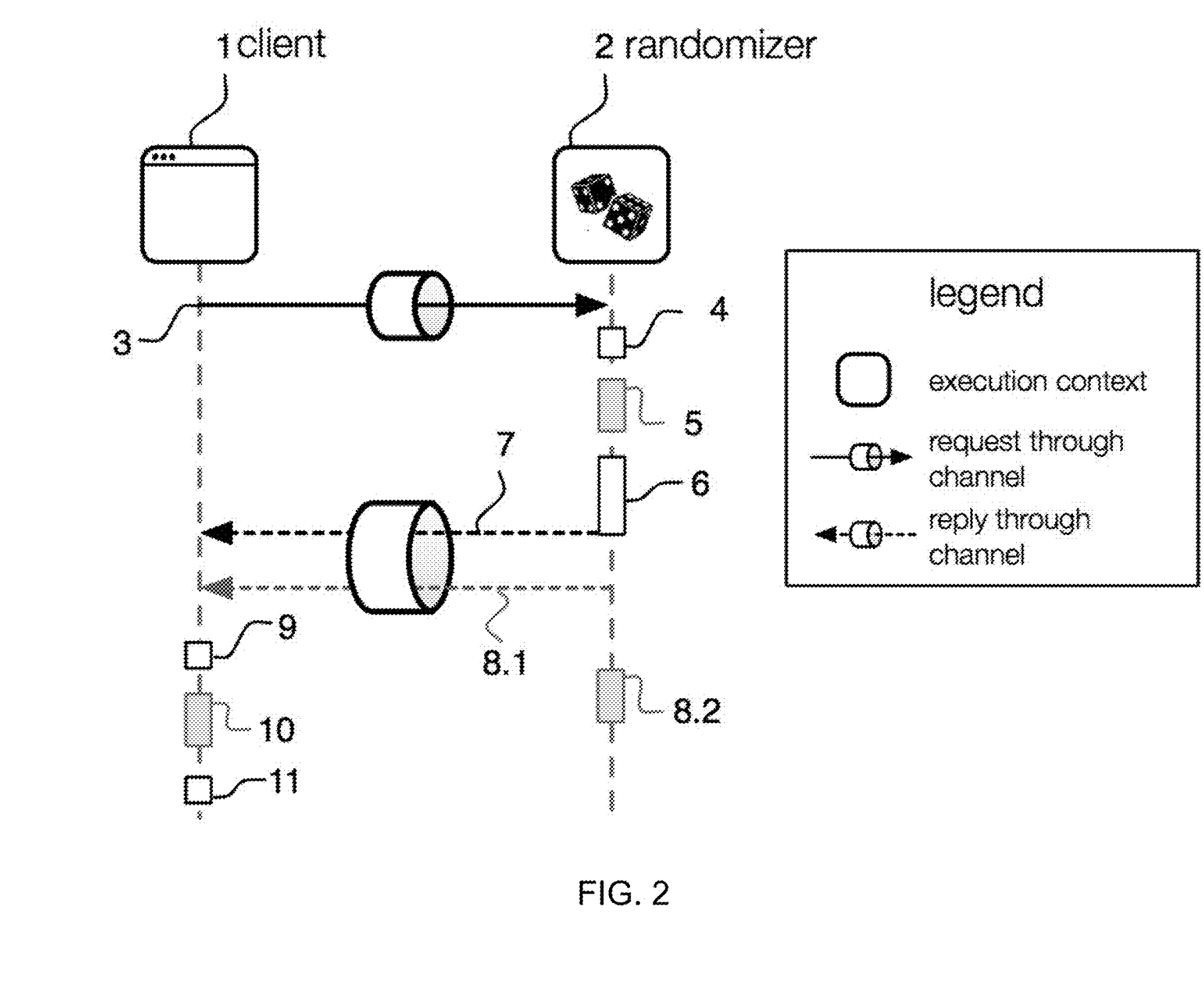
FIG. 2 shows an embodiment of the code randomization/transformation process of the present invention.

Current load-time randomization solutions perform the randomization step inside the same execution context, i.e., operating system process, as the target program. This approach may require giving the program additional permissions, which are not required after randomization, thereby increasing the potential damage that this program can do in the hands of an attacker. The present invention places the randomization engine into a separate execution context, with different permissions from those of the client, and secures the interactions between the two contexts. The randomization engine receives randomization requests from the client and randomizes the code on behalf of the client, without violating any restrictions or adding any requirements to the latter. An instantiation of the present invention proceeds in the following steps (illustrated in FIG. 2):

(3) When the client (1) process begins execution (or, alternatively, inside the OS loader), an entry point inside the client (1) process opens a communication channel to the randomizer (2) and sends a randomization request for the client (1) binary.

(4) The randomizer (2) receives the request, then reads the client (1) binary.

(5) Optionally, the randomizer (2) authenticates the client (1) and ensures the latter is authorized to execute the given file. If the client does not have the required permissions, the randomizer (2) rejects the randomization request, which can result in a variety of actions including termination of the client (1), logging, and reporting of the incident.

(6) The randomizer (2) diversities the contents of the given binary, then outputs the diversified code to a temporary storage location in the randomization cache.

(7) The randomizer (2) sends the location and/or identifier (e.g., a file descriptor) for the randomized code to the client (1) over the communication channel.

(8.1) Optionally, the randomizer (2) sends a list of additional updates (e.g., fixups) over the communication channel to the client, or (8.2) applies the fixups via a cross-context memory modification tool.

(9) The client (1) un-maps the original binary from memory (if needed), then replaces that mapping with the randomization output.

(10) Optionally, the client (1) may need to apply additional data fixups.

(11) The client (1) then proceeds to execute the randomized code.

In some instantiations, the execution context of the randomization engine and the client will reside on the same machine. In other instantiations, the execution context reside on different physical or virtual machines.

A. The Communication Channel

A communication channel between client and the randomization engine is used in 3 above. This channel has several uses:
- It enables the client to send the file path (or another equivalent identifier such as a filesystem inode) of an executable file to the randomizer.
- It provides a way for the randomizer to send the randomized output back to the client, either directly over the channel or in cooperation with the randomization cache.
- If the randomization engine needs to authenticate the client, the channel should provide the means to do so.

There are many different inter-process communication primitives that can be used, depending on the operating system, such as UNIX (computers; computer programs) sockets on LINUX/ANDROID or named pipes on most systems. UNIX sockets will be subsequently discussed in more detail with an illustration of how to use them.

B. Client Authentication

An optional authentication step to prevent a malicious client from executing files without required permissions is provided in 5 above. For example, on a LINUX system, very few programs are allowed to execute the privileged and potentially dangerous su and sudo programs. The su and sudo programs allows users or application to run commands as another user, e.g., most often the root administrator superuser. Attackers could bypass this restriction by requesting the randomization of a dangerous file, then executing the randomized copy. Since the copy is in a different location from the original, and potentially different from the original in other ways that have security implications, the attacker may be able to execute the copy without having permission to execute the original.

To prevent this vulnerability, an additional authentication step is introduced. The client needs to provide proof that it is allowed to execute the binary before the randomization engine performs the randomization. Alternatively, if the operating system provides its own interface for a process to check the execution permissions of another process, the randomization engine can use this interface to authenticate the client. An illustration of how this authentication step would be implemented on a LINUX system is subsequently detailed.

C. The (Randomization) Cache

Example code protection mitigations enforce one significant restriction on software code: all executable memory pages used by the program must be mapped or read from actual files, and no further changes can be made to those pages once loaded in memory. This means that the rewritten (e.g., diversified) code produced by the randomization (or transformation) engine may need to be (temporarily) stored as files in the filesystem, and clients need to map those files into memory. The location that stores these files the randomization cache. There are several options for the actual storage method for the cache, including:

- A writable directory or file on disk, such as "/cache" on ANDROID. This would most likely increase disk usage and internal nonvolatile memory wear.
- A volatile RAM disk backed by physical memory that cannot be evicted/freed/swapped out to disk, accompanied by a mechanism to prevent the cache from using up all system memory. An example of the mechanism is the "least recently used" cache eviction strategy. To free up memory, the oldest file may be deleted (repeatedly) any time space was needed for a new cache entry.
- A RAM disk backed by memory that can be evicted, but not swapped. This approach would reduce disk usage, but could cause processes to lose executable pages and crash if the system runs out of memory. If pages do need to be evicted, the randomizer may re-materialize (rebuild on demand from the original undiversified binary) them using the same RNG (randomization) seed used for the originals. This approach is only viable on operating systems that allow programs to perform their own custom page fault handling, which is only available on LINUX as an experimental feature.
- A RAM disk that can be swapped out to disk as needed. This represents the middle-ground between the other options, preventing the cache from permanently taking disk space and reducing wear, while also reducing memory pressure. Since this option requires a swap file or partition, it is not available on all systems, e.g., ANDROID.
- Any other storage mechanism that the randomization engine can write into and from which the client can map executable code.

These options present a trade-off between disk and RAM usage. Storing randomized code in a file system backed by memory and mapping it into a process does not increase money consumption on a per-process level but being unable to page transformed code out to disk may increase system-wide memory consumption.

D. Additional Fixups

After performing the randomization, the randomization engine needs to update (e.g., relocate or fix up) all references to the randomized code from inside the client memory space. The randomization engine may apply most of these fixups on the randomized code returned to the client, but some lie inside non-code data regions, and must be applied separately. There are several ways to implement this, as follows:

- the randomization engine may use the communication channel to send to the client an encoding of all data fixups to perform, and the client performs the fixups. Alternatively, the encoding can be appended to the randomized code;
- the randomization engine may apply the data fixups directly on the memory image of the client using a cross-context memory modification mechanism, such as shared memory or ptrace on LINUX;
- the randomization engine may produce a full set of data pages with pre-applied data fixups, which the client may then map into its own address space; or
- the client may replicate part of the randomization algorithm independent of the randomization engine to build the list of data fixups, then apply them.

E. Preventing Information Disclosure

Execute-only memory is a mitigation that protects diversified (i.e., randomized) code against memory disclosure. In the present system, the client retrieves the diversified code from the randomization cache and maps it into its own address space for execution. It follows that the code can be mapped from the cache as execute-only pages, if this feature is supported by the host operating system and hardware.

This still leaves the randomization cache as a possible leak target for adversaries. If they manage to locate, open, and read the files in the cache, they would most likely be able to work around the diversification. The randomization cache may be protected against leaks by preventing all applications from directly reading its contents and only allowing clients to map their corresponding randomized files into memory as executable or execute-only pages. If the computer system running the clients does not support execute-only memory at the hardware level, execute-only page permissions may be emulated.

F. Example Embodiment for LINUX

Figure 3:
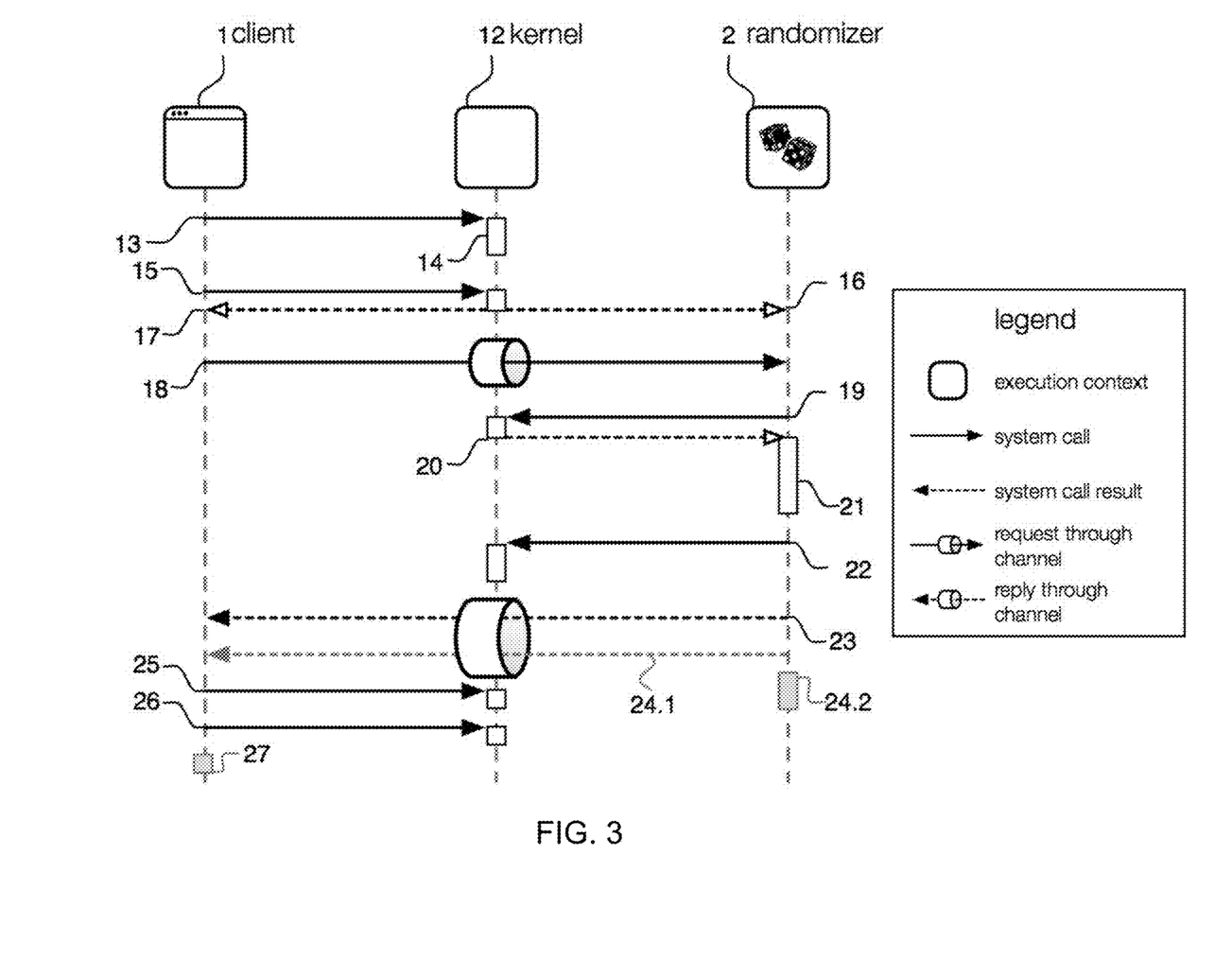
FIG. 3 shows an exemplary embodiment of the present system for the bit LINUX platform.
Figure 4:
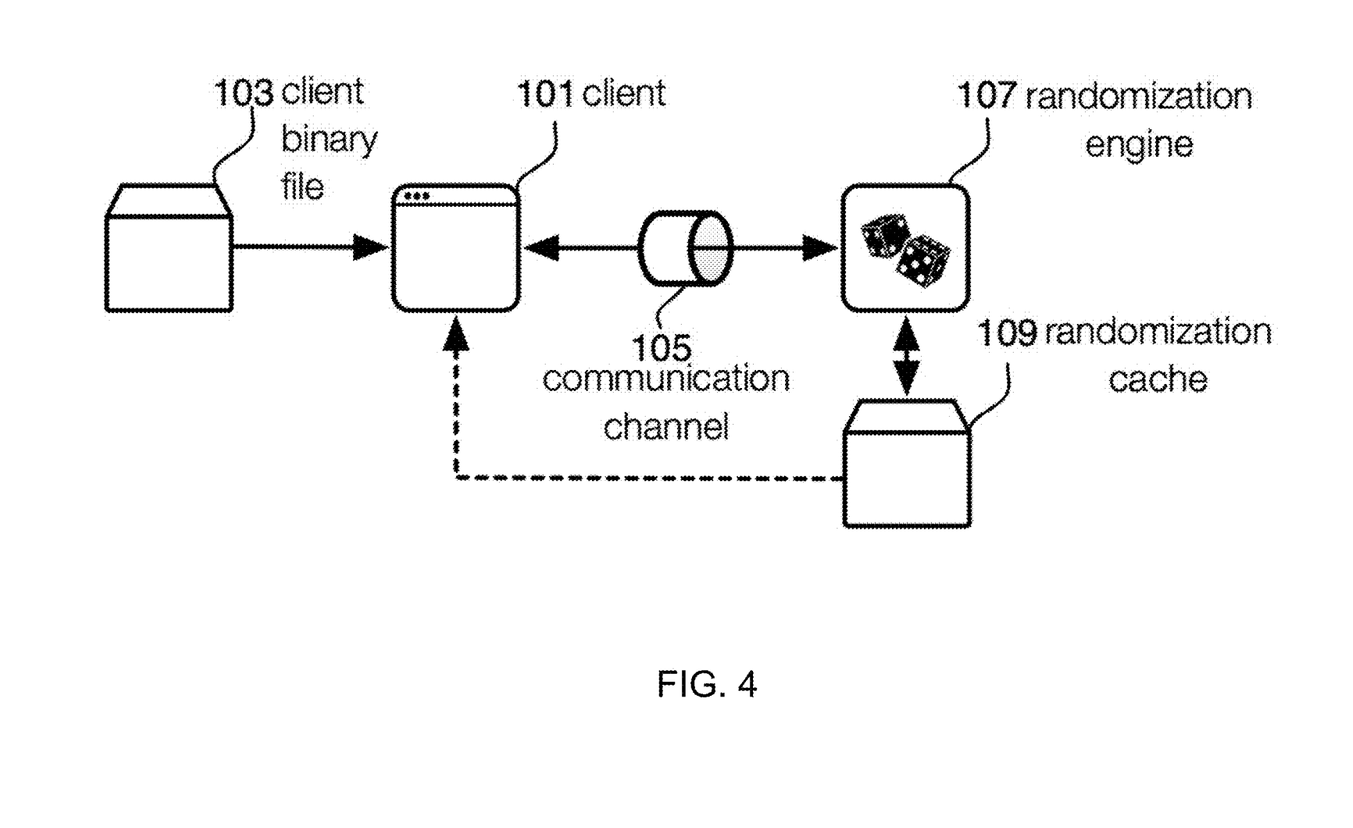
FIG. 4 shows a simplified embodiment of the code randomization process of the present invention.

A concrete example of how software diversification can be performed in an external context on the LINUX operating system is presented. The series of steps taken on a LINUX system (as illustrated in FIG. 3) are:

On LINUX, UNIX sockets are a natural choice for the communication channel. In addition to a data transmission channel between processes (for data such as file paths and names), UNIX sockets also provide a way for applications to exchange file descriptors, as well as retrieve the process identifiers (PIDs) of both ends of the channel. After randomization, the randomization engine sends the location of the randomized copy back to the client using a file descriptor, which is more flexible and secure than sending the file path directly. Additionally, the randomizer can call unlink( ) on the temporary output file to prevent all other applications from accessing the randomized code. After unlinking, the file is still available to processes holding its file descriptor but will not appear in the filesystem.

Figure 5:
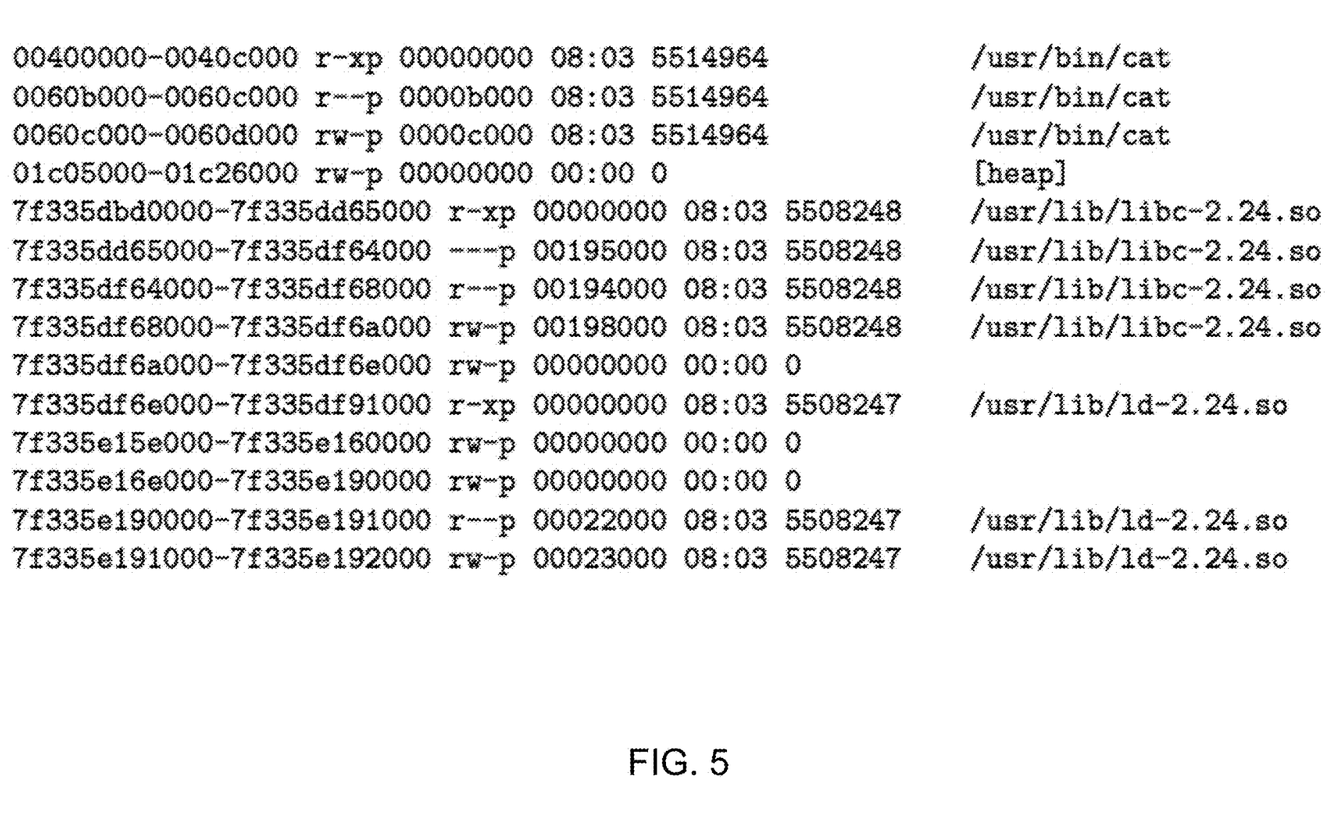
FIG. 5 shows a /proc/ . . . /maps file sample.

The present system may also build on top of UNIX sockets to implement the client authentication step of the process. Before returning randomized code to the client, the randomization engine needs to check that the client is actually allowed to execute that code. On LINUX, this means that the client process must already have a valid executable mapping for that binary. The randomization engine checks the /proc/ . . . /maps file of the client to confirm this (this file contains information for all memory pages mapped by a program, as illustrated in FIG. 5). To locate this file, the randomization engine retrieves the PID of the client from the UNIX socket shared by the client and the randomization engine (the OS kernel provides this PID, so it cannot be tampered with by malicious clients). The PID provides the path to the maps file, e.g., a process with a PID of 1000 has an associated /proc/1000/maps file.

As one skilled in the art will appreciate, any digital computer system can be configured or otherwise programmed to implement the system disclosed herein, and to the extent that a particular digital computer system is configured to implement the system of the present invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the system of the present invention can be distributed to users on a computer readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer or a computer program implementing the present system.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limited in any way. In some embodiments, the figures presented in this patent application are drawn to scale, including the angles, ratios of dimensions, etc. in some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A system for providing randomization-based mitigation of a software code executed via a primary execution context protected by enforcement-based mitigations, wherein an execution context comprises the set of all privileges available to a piece of machine code during execution, wherein said randomization-based mitigation is used in a secondary execution context, wherein the secondary execution context has privileges which bypass the enforcement-based mitigations, thus allowing the randomization-based mitigation to be performed in concert with said enforcement-based mitigations, the system comprising:

(a) at least one computing device, comprising a processor capable of executing computer software comprising computer readable instructions, and a memory space, wherein the at least one computing device executes software comprising enforcement based mitigations, wherein the enforcement based mitigations restrict the functions that processes executed by the at least one computing devices are capable of executing, depending on the execution context of the process, wherein the execution contexts comprise the set of privileges available to a process during execution, wherein the at least one computing device is capable of executing a client process and a randomization engine, wherein the at least one computing device executes software comprising means for processes to open and utilize communication channels between processes, wherein the execution contexts comprise:

i. a primary execution context, wherein the primary execution context is subject to enforcement based mitigations; and ii. a secondary execution context, wherein the secondary execution context is not subject to the restrictions placed on the primary execution context by enforced-based mitigations;

(b) a client binary file, comprising computer readable instructions, stored in the memory space of the at least one computing devices;

(c) the client process, executed by the at least one computing devices capable of initiating execution of the client binary file, capable of accessing a local memory space and a randomization cache, wherein the local memory space comprises a part of the memory space of the computing device, wherein the client binary file is optionally mapped to the local memory space, wherein the client process executes the client binary file in the primary execution context, wherein the client binary file process restricted by enforcement based mitigations;

(d) the randomization engine, herein referred to as a randomizer, executed by the at least one computing device in the secondary execution context, within which randomization-based mitigation of the client binary file is performed, wherein the randomization engine is capable of accessing a randomization cache, wherein an output of the randomizer is a randomized code;

(e) a communication channel operatively connecting the client process and the randomizer; and (f) the randomization cache, comprising a memory space within the memory space of the at least one computing devices operatively coupled to the randomizer, storing the randomized code, wherein when a client process begins execution of the client binary file within the primary execution context, an entry point inside the process opens the communication channel to the randomizer, operating in the secondary execution context, wherein the client process then sends a randomization request and a first identifier to the randomizer via the communication channel, wherein the identifier comprises the location of the client binary file in the local memory space, wherein the randomizer then identifies the location of the client binary file from the first identifier, wherein the randomizer reads the client binary file and subsequently diversifies contents of the client binary file in the secondary execution context, to produce the randomized code, which is then sent to and stored at a location in the randomization cache, wherein the randomizer sends a second identifier to the client process via the communication channel, wherein the second identifier comprises the location of the randomized code, wherein the client process then maps the randomized code to the local memory space in the primary execution context after un-mapping the client binary file from the memory space if necessary, wherein the client process then executes the randomized code in the primary execution context; and wherein the randomizer authenticates the client process via an authentication process provided by an operating system of a machine upon which the client process resides.

2. The system of claim 1, wherein the randomizer is configured to authenticate the client process to ensure the client process is authorized to execute the client binary file, wherein if the client process is not authorized, then the randomizer rejects the randomization request.

3. The system of claim 2, wherein if the randomization request is rejected, the client process is subject to one or more actions comprising: termination, logging or reporting of an attempt to randomize the client binary file.

4. The system of claim 1, wherein the first identifier sent by the client process to the randomizer is the file path of the client binary file.

5. The system of claim 1, wherein the first identifier sent by the client process to the randomizer is a file descriptor of the client binary file.

6. The system of claim 1, wherein the randomizer and the client process reside on the same physical or virtual machine.

7. The system of claim 1, wherein the randomizer and the client process reside on different physical or virtual machines.

8. The system of claim 1, wherein the randomized code is sent directly to the client process via the communication channel bypassing the randomization cache.

9. The system of claim 1, wherein the randomization cache is a writable directory or file on disk.

10. The system of claim 1, wherein the randomization cache is a volatile random-access memory (RAM) disk backed by physical memory that cannot be evicted or swapped out to disk.

11. The system of claim 10, wherein a mechanism to prevent the randomization cache from using up all system memory is provided.

12. The system of claim 1, wherein the randomization cache is a RAM disk backed by memory that can be evicted but not swapped.

13. The system of claim 1, wherein the randomization cache is a RAM disk that can be swapped out to disk.

14. The system of claim 1, wherein the randomized code is mapped from the randomization cache as execute-only pages.

15. The system of claim 1, wherein the randomization cache is configured to refuse read-access to an application attempting to access contents of the randomization cache.

16. The system of claim 1, wherein after producing the randomized code, a plurality of references to the randomized code within the memory space are updated.

17. The system of claim 16, wherein the randomizer performs said updates to one or more of the plurality of references.

18. The system of claim 17, wherein the randomizer performs the updates using a cross-context memory modification mechanism.

19. The system of claim 18, wherein the cross-context modification happens via shared memory.

20. The system of claim 16, wherein the randomizer transmits an encoded list of said updates to the client process via the communication channel, wherein the client process performs the updates.

21. The system of claim 16, wherein the randomizer appends an encoded list of said updates to the randomized code for transmission to the client process via the communication channel, wherein the client process performs the updates.

22. The system of claim 16, wherein the randomizer generates a set of data pages comprising pre-applied updates to the plurality of references, wherein the client process maps the set of data pages to the memory space.

23. The system of claim 16, wherein the client process builds a list of said updates to the plurality of references by replicating a portion of code executed by the randomizer, wherein the client process then performs the updates based on the list.

24. A system for providing transformation of a software code executed via a primary execution context protected by enforcement-based mitigations, wherein an execution context comprises the set of all privileges available to a piece of machine code during execution, wherein said transformation is used in a secondary execution context, wherein the secondary execution context has privileges which bypass the enforcement-based mitigations, thus allowing the transformation to be performed in concert with said enforcement-based mitigations, the system comprising:

(a) at least one computing device, comprising a processor capable of executing computer software comprising computer readable instructions, and a memory space, wherein the at least one computing device executes software comprising enforcement based mitigations, wherein the enforcement based mitigations restrict the functions that processes executed by the at least one computing devices are capable of executing, depending on the execution context of the process, wherein the execution contexts comprise the set of privileges available to a process during execution, wherein the at least one computing device is capable of executing a client process and a transformation engine, wherein the at least one computing device executes software comprising means for processes to open and utilize communication channels between processes, wherein the execution contexts comprise:

i. a primary execution context, wherein the primary execution context is subject to enforcement based mitigations; and ii. a secondary execution context, wherein the secondary execution context is not subject to the restrictions placed on the primary execution context by enforced-based mitigations;

(b) a client binary file, comprising computer readable instructions, stored in the memory space of the at least one computing device;

(c) the client process, executed by the at least one computing devices capable of initiating execution of the client binary file, capable of accessing a local memory space and a transformation cache, wherein the local memory space comprises a part of the memory space of the computing device, wherein the client binary file is optionally mapped to the local memory space, wherein the client process executes the client binary file in the primary execution context, wherein the client binary file process is restricted by enforcement based mitigations;

(d) the transformation engine, executed by the at least one computing devices in the secondary execution contexts within which transformation of the client binary file is performed, wherein the transformation engine is capable of accessing a transformation cache and the local memory space of the client process, wherein an output of the transformation engine is a transformed code;

(e) a communication channel operatively connecting the client process and the transformation engine; and (f) the transformation cache, comprising a memory space within the memory space of the at least one computing devices operatively coupled to the transformation engine, storing the transformed code, wherein when a client process begins execution of the client binary file within the primary execution context, an entry point inside the process opens the communication channel to the transformation engine, operating in the secondary execution context, wherein the client process then sends a transformation request and a first identifier to the transformation engine via the communication channel, wherein the identifier comprises the location of the client binary file in the local memory space, wherein the transformation engine then identifies the location of the client binary file from the first identifier, wherein the transformation engine reads the client binary file and subsequently transforms the contents of the client binary file in the secondary execution context, to produce the transformed code, which is then sent to and stored at a location in the transformation cache, wherein the transformation engine sends a second identifier to the client process via the communication channel, wherein the second identifier comprises the location of the transformed code, wherein the client process then maps the transformed code to the local memory space in the primary execution context after un-mapping the client binary file from the memory space if necessary, wherein the client process then executes the transformed code in the primary execution context;

and wherein the transformation engine authenticates the client process via an authentication process provided by an operating system of a machine upon which the client process resides.

25. The system of claim 24, wherein the transformation engine is configured to authenticate the client process to ensure the client process is authorized to execute the client binary file, wherein if the client process is not authorized, then the transformation engine rejects the transformation request.

26. The system of claim 25, wherein if the transformation request is rejected, the client process is subject to one or more actions comprising: termination, logging or reporting of an attempt to transform the client binary file.

27. The system of claim 24, wherein the first identifier sent by the client process to the transformation engine is the file path of the client binary file.

28. The system of claim 24, wherein the first identifier sent by the client process to the transformation engine is a file descriptor of the client binary file.

29. The system of claim 24, wherein the transformation engine and the client process reside on the same physical or virtual machine.

30. The system of claim 24, wherein the transformation engine and the client process reside on different physical or virtual machines.

31. The system of claim 24, wherein the transformed code is sent directly to the client process via the communication channel bypassing the cache.

32. The system of claim 24, wherein the cache is a writable directory or file on disk.

33. The system of claim 24, wherein the cache is a volatile random-access memory ("RAM") disk backed by physical memory that cannot be evicted or swapped out to disk.

34. The system of claim 24, where in a mechanism to prevent the cache from using up all system memory is provided.

35. The system of claim 24, wherein the cache is a RAM disk backed by memory that can be evicted but not swapped.

36. The system of claim 24, wherein the cache is a RAM disk that can be swapped out to disk.

37. The system of claim 24, wherein the transformed code is mapped from the cache as execute-only pages.

38. The system of claim 24, wherein the cache is configured to refuse read-access to an application attempting to access contents of said cache.

39. The system of claim 24, wherein after producing the transformed code, a plurality of references to the transformed code within the memory space are updated.

40. The system of claim 39, wherein the transformation engine performs said updates to one or more of the plurality of references.

41. The system of claim 40, wherein the transformation engine performs the updates using a cross-context memory modification mechanism.

42. The system of claim 41, wherein the cross-context modification happens via shared memory.

43. The system of claim 39, wherein the transformation engine transmits an encoded list of said updates to the client process via the communication channel, wherein the client process performs the updates.

44. The system of claim 39, wherein the transformation engine appends an encoded list of said updates to the transformed code for transmission to the client process via the communication channel, wherein the client process performs the updates.

45. The system of claim 39, wherein the transformation engine generates a set of data pages comprising pre-applied updates to the plurality of references, wherein the client process maps the set of data pages to the memory space.

46. The system of claim 39, wherein the client process builds a list of said updates to the plurality of references by replicating a portion of code executed by the transformation engine, wherein the client process then performs the updates based on the list.

* * * * *